(12) United States Patent
Daum et al.

(10) Patent No.: US 7,704,476 B2
(45) Date of Patent: Apr. 27, 2010

(54) PROCESS AND PLANT FOR PRODUCING SULFURIC ACID FROM GASES RICH IN SULFUR DIOXIDE

(75) Inventors: Karl-Heinz Daum, Mainz (DE); Hannes Storch, Mörfelden-Walldorf (DE); Jan Rieder, Heidenrod (DE)

(73) Assignee: Outotec OYJ, Espoo (FI)

( * ) Notice: Subject to any disclaimer, the term of this patent is extended or adjusted under 35 U.S.C. 154(b) by 273 days.

(21) Appl. No.: 11/579,435

(22) PCT Filed: Apr. 12, 2005

(86) PCT No.: PCT/EP2005/003798

§ 371 (c)(1), (2), (4) Date: Aug. 21, 2007

(87) PCT Pub. No.: WO2005/105666

PCT Pub. Date: Nov. 10, 2005

(65) Prior Publication Data

US 2008/0145290 A1    Jun. 19, 2008

(30) Foreign Application Priority Data

May 5, 2004    (DE) .................. 10 2004 022 506

(51) Int. Cl.
B01D 53/56 (2006.01)
C01F 1/00 (2006.01)
C01B 17/69 (2006.01)

(52) U.S. Cl. .......... 423/242.1; 423/244.1; 423/161; 423/522

(58) Field of Classification Search .............. None
See application file for complete search history.

(56) References Cited

U.S. PATENT DOCUMENTS

| | | | |
|---|---|---|---|
| 2,180,727 A | 11/1939 | Carter | 23/175 |
| 2,655,431 A | 10/1953 | Allen et al. | 23/168 |
| 3,490,868 A | 1/1970 | Furkert | 23/168 |
| 3,780,499 A | 12/1973 | Dorr et al. | 55/32 |
| 3,788,043 A | 1/1974 | Dorr et al. | 55/237 |
| 3,875,294 A | 4/1975 | Reh et al. | 423/534 |
| 3,907,979 A | 9/1975 | Jenninges | 423/522 |
| 4,285,927 A | 8/1981 | Hara et al. | |
| 4,368,183 A | 1/1983 | Dorr et al. | 423/522 |
| 4,996,038 A | 2/1991 | McAlister et al. | 423/522 |
| 5,593,652 A | 1/1997 | Peng | 423/522 |
| 6,279,514 B1 | 8/2001 | Browder et al. | 122/7 |
| 6,500,402 B1 | 12/2002 | Winkler et al. | 423/522 |

FOREIGN PATENT DOCUMENTS

| | | |
|---|---|---|
| DE | 1054431 | 4/1959 |
| DE | 30303 | 10/1963 |
| DE | 20 50 580 | 4/1972 |
| DE | 2 223 131 | 5/1972 |
| DE | 22 13 580 A1 | 3/1975 |
| DE | 28 20 231 | 5/1978 |
| DE | 15 67 716 | 7/1979 |
| DE | 30 00 599 | 7/1980 |
| DE | 29 45 021 | 5/1981 |
| DE | 33 03 289 | 8/1984 |
| DE | 691 05 961 | 10/1991 |
| DE | 19522 927 | 1/1997 |
| DE | 198 00 800 | 7/1999 |
| EP | 0218411 | 4/1987 |
| GB | 1603093 * | 8/1977 |
| GB | 21 81 120 A | 4/1987 |
| WO | WO 91/14651 | 10/1991 |
| WO | WO 2004/037719 | 5/2004 |

OTHER PUBLICATIONS

Elvers, B. Ullmann's Encyclopedia of Industrial Chemistry; vol. A 25, Sulfuric Acid and Sulfur Trioxide 655-668 1992.
Connock, L., "Systems for Enhanced Energy Recovery", *Sulphur*, Sulphuric Acid Technology, British Sulphur Publishing Co., London, GB, No. 278, pp. 41-47 (Jan.-Feb. 2002) XP-001075186.
Derwent Publications Ltd. An 2002-032802, XP002269015 & RU 2174 945, Abstract Oct. 20, 2001.
International Search report (PCT/EP2005/003798) mailed Oct. 2, 2006.
U.S. Appl. No. 11/592,290, filed Aug. 23, 2007, Karl-Heinz Daum et al.
U.S. Appl. No. 11/816,693, Karl-Heinz Daum.

* cited by examiner

*Primary Examiner*—Melvin C Mayes
*Assistant Examiner*—Sheng Han
(74) *Attorney, Agent, or Firm*—Darby & Darby

(57) ABSTRACT

The present invention relates to a process and a plant for producing sulfuric acid, in which a starting gas containing sulfur dioxide at least partly reacts with molecular oxygen in at least one contact with at least one contact stage to form sulfur trioxide, and in which the sulfur-trioxide-containing gas produced is introduced into an absorber and converted there to sulfuric acid. To achieve that only small gas volumes must be supplied to the first contact stage, based on the amount of sulfur dioxide used, with at least the same capacity of the plant and by using conventional catalysts, it is proposed in accordance with the invention to supply to the first contact stage a contact gas with a sulfur dioxide content of more than 16 vol-% and with a volumetric ratio of sulfur dioxide to oxygen of more than 2.67:1.

22 Claims, 5 Drawing Sheets

PROCESS AND PLANT FOR PRODUCING SULFURIC ACID FROM GASES RICH IN SULFUR DIOXIDE

This application claims the benefit of International Application No. PCT/EP2005/003798 filed on Apr. 12, 2005 under 35 U.S.C. §371, entitled, "Process and Plant For Producing Sulfuric Acid From Gases Rich In Sulfur Dioxide" which claims benefit of German Patent Application No. 10 2004 022 506.0 filed on May 5, 2004.

TECHNICAL FIELD

The present invention relates to a process for producing sulfuric acid, in which a starting gas containing sulfur dioxide at least partly reacts with molecular oxygen in at least one contact with at least one contact stage to form sulfur trioxide, and in which the sulfur-trioxide-containing gas produced is introduced into an absorber and converted to sulfuric acid, and to a corresponding plant.

Conventionally, the production of sulfuric acid is effected by the so-called double absorption process which is described in Ullmann's Encyclopedia of Industrial Chemistry, 5th edition, Vol. A25, pages 635 to 700. For catalyzing the oxidation of sulfur dioxide to sulfur trioxide, catalysts containing vanadium pentoxide as active component are typically used with an operating range of 380 to 640° C. While an irreversible damage of the catalyst occurs at temperatures above 640° C., the same is inactive at temperatures below 380° C. To avoid a damage of the catalyst, starting gases with a sulfur dioxide content of maximally 13 vol-% are usually charged thereto, as excessive temperatures are obtained in the catalyst bed due to the exothermicity of the oxidation reaction, when gases of a higher concentration are used. The result is that before being charged to the catalyst, gases of a higher concentration must first be diluted with air and/or tonnage oxygen, and correspondingly large gas volumes must be passed through the catalyst. In particular when utilizing pyrometallurgical waste gases as sulfur-dioxide-containing starting gases, which are produced for instance when calcining and melting sulfidic copper and nickel concentrates and typically have a sulfur dioxide content of 20 to 60 vol-%, a great dilution factor thus is necessary. This leads to disproportionately high investment and operating costs of the sulfuric acid plant.

Beside the temperature, the yield of sulfur trioxide is decisively influenced by the volumetric ratio of sulfur dioxide to oxygen in the starting gas. The partial reactions taking place during the oxidation of sulfur dioxide to sulfur trioxide by means of conventional vanadium pentoxide catalysts can be described in a simplified way by the following formulae:

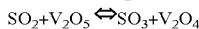

$SO_2 + V_2O_5 \Leftrightarrow SO_3 + V_2O_4$

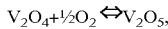

$V_2O_4 + \tfrac{1}{2}O_2 \Leftrightarrow V_2O_5,$ which corresponds to a total reaction of

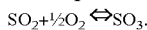

$SO_2 + \tfrac{1}{2}O_2 \Leftrightarrow SO_3.$

According to the principle of Le Châtelier, a higher yield of sulfur trioxide thus can be expected with increasing partial pressure of sulfur dioxide in the starting gas. In practice, a hyperstoichiometric amount of oxygen therefore is used for the oxidation of sulfur dioxide to sulfur trioxide, based on the amount of $SO_2$, namely an amount of $O_2$ corresponding to a volumetric ratio $O_2/SO_2$ greater than 0.75, preferably corresponding to a ratio of 1 to 1.2, which corresponds to a volumetric ratio $SO_2/O_2$ of 1:1 to 1:0.83. Therefore, the sulfur-dioxide-containing starting gases, which in general were obtained by combustion of sulfur, must be further diluted with air or tonnage oxygen, apart from the necessity to adjust the sulfur dioxide content to a value below 13 vol-%, also for adjusting a favourable volumetric ratio of $O_2$ to $SO_2$, which contributes to the correspondingly large gas volumes to be passed through the catalyst and to the correspondingly high investment and operating costs of conventional sulfuric acid plants.

To overcome these disadvantages, processes for producing sulfuric acid have already been proposed, in which starting gases with a sulfur dioxide content of more than 13 vol-% can be supplied to the catalyst.

Some of these processes provide an alternative catalyst, which can also be operated at temperatures higher than 640° C. (WO 99/36175 A1).

DE-OS 20 26 818 discloses a process for the catalytic oxidation of sulfur dioxide to sulfur trioxide in a plurality of contact stages with an intermediate absorption of the sulfur trioxide formed, in which before being introduced into the first contact stage, the starting gases are diluted with dilution air and with sulfur trioxide expulsed from oleum to obtain a sulfur dioxide concentration of 10 to 20 wt-%. What is disadvantageous in this process, however, is the amount of apparatus involved and the technical expenditure necessary for the continuous expulsion of sulfur trioxide from oleum and the comparatively low utilization of the sulfur dioxide in the first contact stage, as only sulfur trioxide is recirculated, but not the reactants sulfur dioxide and oxygen.

To be able to process starting gases with a sulfur dioxide content of 13 to 66 vol-% to sulfuric acid at low cost by using conventional catalysts, DE 102 49 782 A1 proposes a process for producing sulfuric acid, in which from a contact stage upstream of the last main contact stage a partial stream of the gas containing sulfur dioxide and sulfur trioxide is withdrawn, this partial stream is mixed with the starting gas to obtain a contact gas with a sulfur dioxide content of more than 13 vol-% and is recirculated to the first contact stage. As a result of the dilution of the starting gas, comparatively large gas volumes are, however, passed through the catalyst in this process as well.

From U.S. Pat. No. 2,180,727 there is finally known a process for the catalytic conversion of sulfur dioxide to sulfur trioxide with three contact stages, in which a contact gas with a maximum sulfur dioxide concentration of 16 vol-%, a ratio of sulfur dioxide to oxygen of maximally 2.67:1, and a temperature of 412 to 415° C. is supplied to the first contact stage, and after the catalytic conversion the sulfur-trioxide-containing process gas withdrawn from the first contact stage is mixed with a corresponding volume of air for cooling and adjusting a hyperstoichiometric oxygen content, before the resulting gas mixture is supplied to the second contact stage and further oxidized therein. The gas leaving the second contact stage is cooled again and, to adjust a hyperstoichiometric ratio of sulfur dioxide to oxygen, mixed with oxygen and supplied to a third contact stage, before the gas leaving the third contact stage finally is supplied to an absorption stage for forming sulfuric acid. However, this process is also limited as regards the maximum concentration of sulfur dioxide in the starting gas supplied to the first contact stage, so that large gas volumes must be passed through the individual contact stages. In addition, the vanadium catalyst used will deteriorate under the chosen process conditions and will become inactive after a certain period.

DESCRIPTION OF THE INVENTION

Therefore, it is the object of the present invention to provide for the inexpensive production of sulfuric acid on the basis of concentrated starting gases, in particular to provide a process for producing sulfuric acid, in which only small gas volumes must be supplied to the first contact stage, based on the amount of sulfur dioxide used.

In accordance with the invention, this object is solved by a process as mentioned above, in which a contact gas with a sulfur dioxide content of more than 16 vol-% and with a volumetric ratio of sulfur dioxide to oxygen of more than 2.67:1 is supplied to the first contact stage.

In accordance with the present invention it could surprisingly be found that the catalytic oxidation of sulfur dioxide to sulfur trioxide with a understoichiometric oxygen content, namely a volumetric ratio $SO_2/O_2$ of more than 2.67:1 or even more than 10:1, can be operated continuously when the starting gas has an $SO_2$ content of more than 16 vol-%. The use of normal catalysts containing vanadium pentoxide is possible, a satisfactory yield also being achievable on an industrial scale without damage to the catalyst. Due to the comparatively high $SO_2$ content on the one hand and the comparatively low oxygen content on the other hand, considerably smaller volumes of starting gas, based on the amount of $SO_2$, are supplied to the first contact stage in the process of the invention as compared to the prior art. The investment costs for the plant required for performing the process thereby are reduced considerably. In particular, this amount of 50 to 150 liters/daily ton of starting gas compared with the conventionally required amount of 160 to 250 liters/daily ton of starting gas requires a substantially lower specific quantity of catalyst. The displacement of the equilibrium of the oxidation reaction as a result of the high $SO_2$ content on the part of the products is compensated by the under-stoichiometric oxygen content, based on the amount of $SO_2$, which displaces the thermodynamic equilibrium of the oxidation reaction on the part of the educts. By correspondingly adjusting the $SO_2$ content on the one hand and the volumetric ratio $SO_2/O_2$ on the other hand, the temperature in the contact stage thus can be adjusted to a value below the temperature that leads to an irreversible damage of the catalyst, in the case of the use of vanadium pentoxide to a temperature of maximally 640° C., and an overheating of the catalyst thus can be avoided.

Preferably, the contact gas supplied to the first contact stage has a sulfur dioxide content of more than 20 vol-%, in particular preferably more than 40 vol-%, particularly preferably more than 60 vol-%, quite particularly preferably more than 80 vol-%, and highly preferably more than 90 vol-%. In this way, the amounts of contact gas to be supplied to the first contact stage, based on the amount of $SO_2$, are particularly low.

To avoid an irreversible damage of the catalyst as a result of overheating, the volumetric ratio of $SO_2$ to oxygen of the contact gas supplied to the first contact stage, in dependence on the amount of $SO_2$, preferably is more than 4:1, particularly preferably more than 6:1, quite particularly preferably more than 8:1, and highly preferably more than 10:1.

In principle, all concentrated gas mixtures containing sulfur dioxide and oxygen, which were produced in any way known to those skilled in the art, for instance corresponding gases produced in pyrometallurgical plants, can be used as starting gases in the process of the invention. In particular gas mixtures obtained by combustion of elementary sulfur with tonnage oxygen, which preferably has an oxygen content of at least 95 to 98 vol-%, preferably those with a sulfur dioxide content of 80 to 99.99 vol-%, an oxygen content of 0.01 to 10 vol-%, and a content of molecular nitrogen or other inert gases of 0 to maximally 10 vol-%, and particularly preferably those with a sulfur dioxide content of 90 to 95 vol-%, an oxygen content of 3 to 7 vol-%, and with a content of molecular nitrogen or other inert gases of 0 to maximally 5 vol-%, or gas mixtures of the same composition, which were produced by other processes, turned out to be useful as starting gases. The same can be supplied to the first contact stage undiluted or upon dilution with air or preferably tonnage oxygen for adjusting a suitable volumetric ratio $SO_2/O_2$ and a suitable $SO_2$ content. A particular advantage of this embodiment consists in that due to the absence or the low content of molecular nitrogen in the contact gas, the sulfuric acid obtained with the process of the invention contains no nitrogen oxide ($NO_x$) impurities or at least, compared with the processes known in accordance with the prior art, in which air with an $N_2$ content of about 79 vol-% is used as combustion gas, contains nitrogen oxide ($NO_x$) impurities reduced by one order of magnitude. Accordingly, in dependence on the purity of the tonnage oxygen used for the combustion of sulfur and/or of the tonnage oxygen possibly used for diluting the sulfur-dioxide-containing starting gas, no or at best very small amounts of waste gas are produced, so that the specific emissions, based on the amount of sulfuric acid formed, are substantially lower as compared to the conventional processes. Furthermore, no drying tower for drying the ambient air is required for performing the process of the invention, if no dilution gas or tonnage oxygen is used as dilution gas instead of air.

In principle, any catalyst known to those skilled in the art as useful for oxidizing sulfur dioxide to sulfur trioxide can be used in the process of the invention. Good results are obtained in particular with conventional catalysts containing vanadium pentoxide. What has also been used quite successfully are iron-containing catalysts, in particular granular catalysts comprising a porous supporting material, preferably with a BET surface area of 100 to 2000 $m^2/g$ and an $SiO_2$ content of at least 90 wt-% and an active component containing 10 to 80 wt-% iron, the weight ratio of supporting material to active component particularly preferably lying in the range from 1 to 100.

In the case of catalysts containing vanadium pentoxide, for instance, an inlet temperature of the contact gas into the first contact stage of about 450° C., in particular of about 470° C. and most preferably about 500° C. turned out to be particularly useful. When using granular catalysts comprising a porous supporting material of $SiO_2$ with an active component containing 10 to 80 wt-% iron, the inlet temperature in this catalyst preferably is about 500° C., particularly preferably about 520° C. and quite particularly preferably about 540° C.

Preferably, the contact gas is supplied to the first contact stage with a pressure of 1 to 30 bar, and particularly preferably with a pressure of 3 to 12 bar. In this way, the amount of gas actually supplied to the first contact stage is further reduced on the one hand, and on the other hand the thermodynamic equilibrium of the oxidation reaction is displaced on the part of $SO_3$ because of the elevated pressure. Since the yield of $SO_3$ in particular depends on four parameters, namely the temperature, the pressure, the amount of $SO_2$ and the ratio $SO_2/O_2$ in the first contact stage, satisfactory yields of sulfur trioxide can be obtained even with a particularly high ratio $SO_2/O_2$ due to the elevated pressure. In this embodiment, it has also turned out to be expedient to produce the starting gas already under the chosen pressure, in that for instance during the combustion of elementary sulfur both the liquid sulfur and the tonnage oxygen used for combustion and/or the used combustion air are supplied to the combustion chamber with the indicated pressure and the combustion chamber is operated at this pressure. The advantage is that the sulfuric acid plant requires no gas blower for conveying the process gases through the contact and absorption stages.

To avoid an irreversible damage of the catalyst during operation of the first contact stage, the sulfur dioxide content, the volumetric ratio $SO_2/O_2$, the inlet pressure and the inlet temperature of the contact gas supplied to the first and all succeeding contact stages are chosen such that in the contact stage a temperature is obtained, which lies below the temperature that leads to a damage of the catalyst, but above the operating temperature of the catalyst. In the case of a catalyst containing vanadium pentoxide, the upper limit of the temperature to be adjusted is about 640° C., and the lower limit is about 380° C.

In accordance with a first embodiment of the present invention, further contact stages, preferably 2 to 4 further contact stages, are provided downstream of the first contact stage, the individual contact stages being combined to one or more, preferably one or two contacts. Downstream of each contact, an absorber can be provided, in which sulfur trioxide is at least partly, preferably completely removed from the process gas and converted to sulfuric acid, liquid $SO_3$ or oleum in a manner known to those skilled in the art. The sulfur-trioxide-containing process gas leaving the first to penultimate contact stages is mixed with oxygen for adjusting a suitable ratio $SO_2/O_2$ and cooled to an inlet temperature suitable for the next contact stage, before it is supplied to the respectively succeeding contact stage for further oxidation. The adjustment of the necessary inlet temperature into the respectively succeeding contact stage can be achieved by adding correspondingly tempered oxygen-containing gas, for instance liquefied $O_2$, and/or by means of a heat exchanger. It is mostly necessary to also operate the second and/or the succeeding contact stages with a contact gas with a understoichiometric oxygen content, based on the $SO_2$ content. The process gas leaving the last contact stage is supplied to an absorber, in which sulfur trioxide is removed from the process gas by forming sulfuric acid, liquid $SO_3$ or oleum, and the resulting waste gas can, if necessary, be removed via a chimney, for instance after a chemical posttreatment in a gas washing plant operated e.g. with hydrogen peroxide, or be supplied to a further treatment in the sulfuric acid plant.

In accordance with a second embodiment of the present invention it is likewise provided that downstream of the first contact stage further contact stages, preferably 2 to 4 contact stages, are disposed, which are preferably combined to one or two contacts, but that a partial stream of the contact gas leaving the first contact stage and/or one or more of the succeeding contact stages is withdrawn and this partial stream or these partial streams is/are mixed with the starting gas before the same enters the first contact stage. In this way, the sulfur dioxide content and the ratio $SO_2/O_2$ of the starting gas can be adjusted to a suitable value for the first contact stage. On the other hand, this results in a better utilization of energy, as the recirculation of the thermal energy of the recirculated, partly converted and hot process gas is utilized for preheating the starting gases. As a result, this procedure requires correspondingly smaller heat exchangers. In accordance with the invention, however, only such amounts of process gas are recirculated, which provide a contact gas supplied to the first contact stage with a sulfur dioxide content of more than 16 vol-% and with a volumetric ratio of sulfur dioxide to oxygen of more than 2.67:1.

As an alternative, it is also possible to withdraw and recirculate the partial stream or the partial streams not directly at the outlet of the respective contact stages, but only after the intermediate or final absorption stages, so that less sulfur trioxide, which displaces the thermodynamic equilibrium of the oxidation reaction on the part of the educts, is introduced into the contact gas to be supplied to the first contact stage.

Furthermore, instead of being recirculated to the gas to be supplied to the first contact stage, the partial stream withdrawn from a contact stage and/or from the first intermediate absorber can also be supplied to the gas (air or preferably tonnage oxygen) used for the combustion of sulfur for producing the sulfur-dioxide-containing starting gas and/or directly to the sulfur burner. As those skilled in the art will recognize, it is of course also possible to combine the aforementioned alternatives in any way, for instance to supply one part of the partial stream to the gas to be supplied to the first contact stage and the other part of the partial stream to the gas used for the combustion of the elementary sulfur.

Finally, in accordance with a third embodiment of the present invention, the process can be operated with only one contact, which preferably consists of 1 to 3 contact stages, wherein preferably at least part of the process gas leaving the contact and/or the absorber downstream of the contact is withdrawn and recirculated to the starting gas to be supplied to the first contact stage and/or to the combustion gas to be supplied to the combustion of sulfur and/or directly into the sulfur burner.

Preferably, the partial stream or partial streams in accordance with the second and third embodiments of the invention, which was/were mixed with the starting gas before entrance thereof into the first contact stage, is/are dimensioned such that the contact gas supplied to the first contact stage consists of 60 to 99.99 vol-% sulfur dioxide, 0.01 to 20 vol-% oxygen, 0 to 20 vol-% sulfur trioxide and 0 to maximally 10 vol-% nitrogen or another inert gas, and particularly preferably of 90 to 95 vol-% sulfur dioxide, 3 to 7 vol-% oxygen, 0.01 to 5 vol-% sulfur trioxide and 0 to maximally 5 vol-% nitrogen or another inert gas.

Furthermore, the present invention relates to a plant for producing sulfuric acid, liquid $SO_3$ or oleum from gases rich in sulfur dioxide, which can be used in particular for performing the process of the invention.

In accordance with the invention, the plant includes at least one contact with a least one contact stage for reacting a starting gas containing $SO_2$ with oxygen to obtain $SO_3$, and at least one absorber, wherein the inlet region of the first contact stage is connected with the outlet region of one or more contact stages and/or with the outlet region of one or more absorbers via one or more recirculation conduit(s).

Preferably, the at least one recirculation conduit leads from the outlet region of the first contact to the inlet region of the first contact stage.

In accordance with a development of the invention it is proposed that the plant includes 3 to 5 contact stages, which particularly preferably are combined in one or two contacts. In principle, the individual contact stages can include any catalyst material known to those skilled in the art for this purpose. Preferably, however, conventional catalysts are provided, for instance those on the basis of vanadium pentoxide with or without addition of caesium, or on the basis of other metal oxides such as iron oxide.

In accordance with a particular embodiment of the present invention, the plant additionally includes a sulfur burner with a combustion chamber for the combustion of elementary sulfur with tonnage oxygen or air, the sulfur burner and/or the inlet region of the combustion chamber being connected with the outlet region of one or more contact stages and/or with the outlet region of one or more absorbers.

The invention will subsequently be explained in detail with reference to embodiments and the drawing. All features described and/or illustrated in the Figures form the subject-matter of the invention, independent of their inclusion in the claims or their back-reference.

DETAILED DESCRIPTION OF THE PREFERRED EMBODIMENTS

Figure 1:
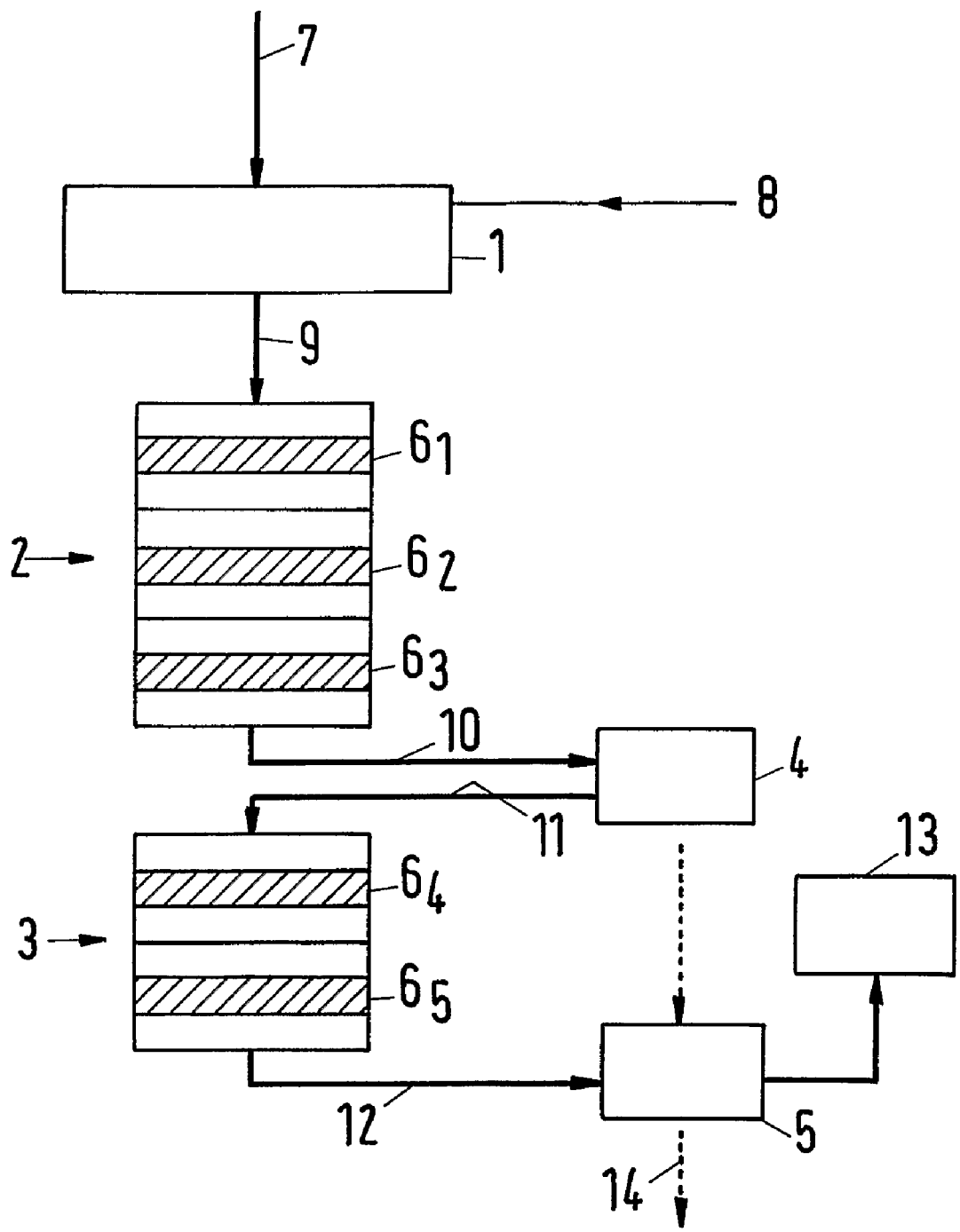
FIG. 1 shows a process diagram of a process and a plant in accordance with the prior art.

The conventional plant as shown in FIG. 1 for producing sulfuric acid in accordance with the prior art, as it is described for instance in Ullmann's Encyclopedia of Industrial Chemistry, comprises a sulfur burner 1, two contacts 2, 3, an intermediate absorber 4 and a final absorber 5. While the first contact 2 (primary contact) includes three contact stages (catalyst layers) $6_1$ to $6_3$, which each have a catalyst on the basis of vanadium pentoxide, the second contact 3 (secondary contact) includes two contact stages $6_4$, $6_5$. Between the individual contact stages $6_1$ to $6_5$, there is each disposed an intermediate cooler (not shown), in which the process gas leaving the preceding contact stage $6_1$ to $6_4$ is cooled down to a temperature suitable for entrance into the respectively next contact stage $6_2$ to $6_5$.

In the sulfur burner 1, starting gas with less than 13 vol-%, usually with 10 to 12 vol-% sulfur dioxide and with a volumetric ratio $SO_2/O_2$ of about 1:1 to 1:0.83 is produced by combustion of elementary sulfur with air. For this purpose, elementary sulfur, generally in liquid form with a temperature of 140 to 150° C., is continuously supplied to the sulfur burner 1 via supply conduit 7, and air which has possibly been dried in advance in a drying tower (not shown) is supplied via supply conduit 8, wherein the hyperstoichiometric oxygen content in the resulting starting gas is controlled by the amount of air introduced into the sulfur burner and/or adjusted by the subsequent addition of dilution air. Via conduit 9, the starting gas is passed through a heat exchanger (not shown), in which the same is preheated to the inlet temperature of the first contact stage $6_1$ and is subsequently supplied to the first contact stage $6_1$, before the gas mixture is sequentially passed through the three contact stages $6_1$ to $6_3$ of the first contact 2 for oxidation. Gas leaving the first contact 2 is supplied to the intermediate absorber 4 via conduit 10 and brought in contact with aqueous sulfuric acid, a large part of the sulfur trioxide formed in the first contact being absorbed by forming sulfuric acid. Subsequently, the remaining gas is supplied to the second contact 3 via conduit 11 and sequentially passed through its two contact stages $6_4$ and $6_5$. Gas leaving the second contact 3 is supplied via conduit 12 to the final absorber 5, in which the sulfur trioxide formed is converted to sulfuric acid. While the waste gas is discharged from the plant via the chimney 13, the sulfuric acid produced in the intermediate absorber 4 and in the final absorber 5 is combined and discharged from the plant as a single mass flow via the product discharge conduit 14.

Figure 2:
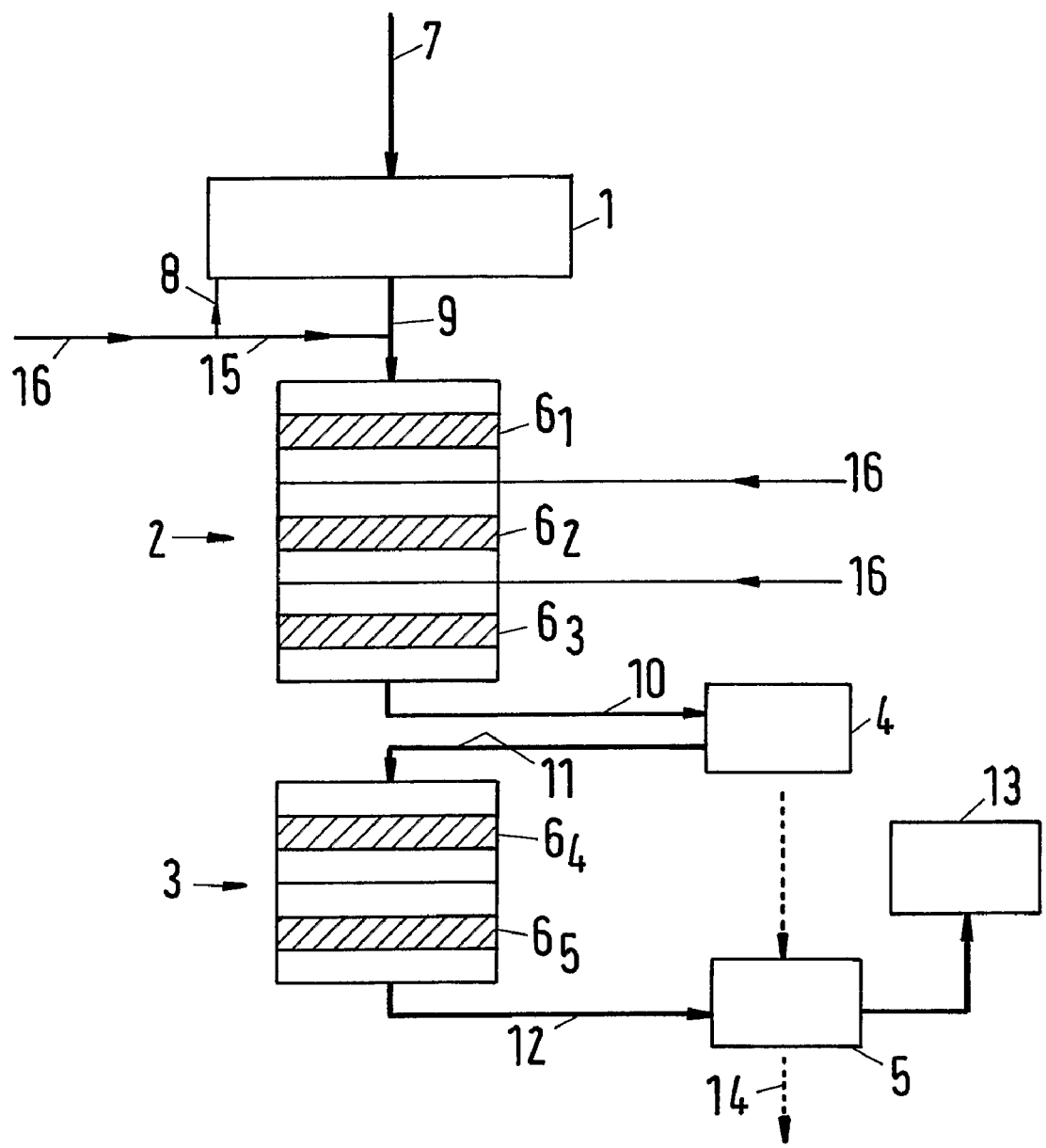
FIG. 2 shows a process diagram of a process and a plant in accordance with a first embodiment of the present invention.

As can be taken from FIG. 2, the plant in accordance with a first embodiment of the present invention comprises the components of the conventional apparatus described above, which for the sake of simplicity are provided with the same reference numerals, and in addition includes a plurality of supply conduits 8, 15, 16 for tonnage oxygen, which lead into the sulfur burner 1, the gas supply conduit 9 and the gas conduits provided between the contact stages $6_1$ and $6_2$ as well as $6_2$ and $6_3$, respectively.

In the process of the invention, in contrast to the prior art, a contact gas with a sulfur dioxide content of more than 16 vol-% and with a volumetric ratio of sulfur dioxide to oxygen of more than 2.67:1 is supplied to the first contact stage. In the process performed as shown in FIG. 2, this contact gas is produced in that elementary sulfur is continuously introduced into the sulfur burner 1 via supply conduit 7, and tonnage oxygen as combustion gas is introduced via the supply conduits 16 and 8. By adjusting the amount of tonnage oxygen supplied to the sulfur burner 1 per unit of time, based on the amount of elementary sulfur, the sulfur dioxide content of the resulting gas can be adjusted to the desired value, which is more than 20 vol-%, normally more than 40 or 60 vol-%, preferably, however, more than 80 vol-% and particularly preferably more than 90 vol-%.

The highly concentrated gas produced is withdrawn from the sulfur burner 1 via conduit 9, and its oxygen content, based on the sulfur dioxide content, is possibly adjusted to a desired value by means of tonnage oxygen supplied via conduit 15, preferably to a volumetric ratio of sulfur dioxide to oxygen of 4:1, particularly preferably more than 6:1, quite particularly preferably more than 8:1 and highly preferably more than 10:1. Subsequently, the gas mixture thus produced is passed through a heat exchanger (not shown), in which it is heated to the suitable inlet temperature of the first contact stage $6_1$, in the case of a catalyst comprising vanadium pentoxide preferably to about 450° C. and particularly preferably to about 470° C., and supplied to the first contact stage $6_1$. To avoid a damage of the catalyst in the case of a continuous operation of the plant, the sulfur dioxide content, the volumetric ratio $SO_2/O_2$, the inlet pressure and the inlet temperature of the contact gas supplied to the first contact stage $6_1$ and to the succeeding contact stages $6_2$ to $6_5$ are chosen such that in the respective contact stage a temperature is obtained, which lies below the temperature that leads to a damage of the catalyst, but above the operating temperature of the catalyst.

Upon cooling, process gas withdrawn from the first contact stage $6_1$ is mixed with tonnage oxygen supplied via conduit 16 for adjusting a volumetric ratio $SO_2/O_2$ suitable for the second contact stage $6_2$, which in dependence on the $SO_2$ content of the process gas can correspond to a understoichiometric or hyperstoichiometric oxygen content, and is possibly supplied to an intermediate cooler, the optimum volumetric ratio depending in particular on the $SO_2$ content of the process gas and on the inlet pressure and the inlet temperature of the second contact stage $6_2$.

Due to the comparatively high $SO_2$ content on the one hand and the comparatively low oxygen content, based on the $SO_2$ content, on the other hand, considerably smaller volumes of starting gas, based on the amount of $SO_2$, are supplied to the first contact stage in this process as compared to the known processes of the prior art, which on the whole results in considerably lower investment costs as compared to the conventional processes. In particular, a significantly lower specific quantity of catalyst is required as a result thereof.

Figure 3:
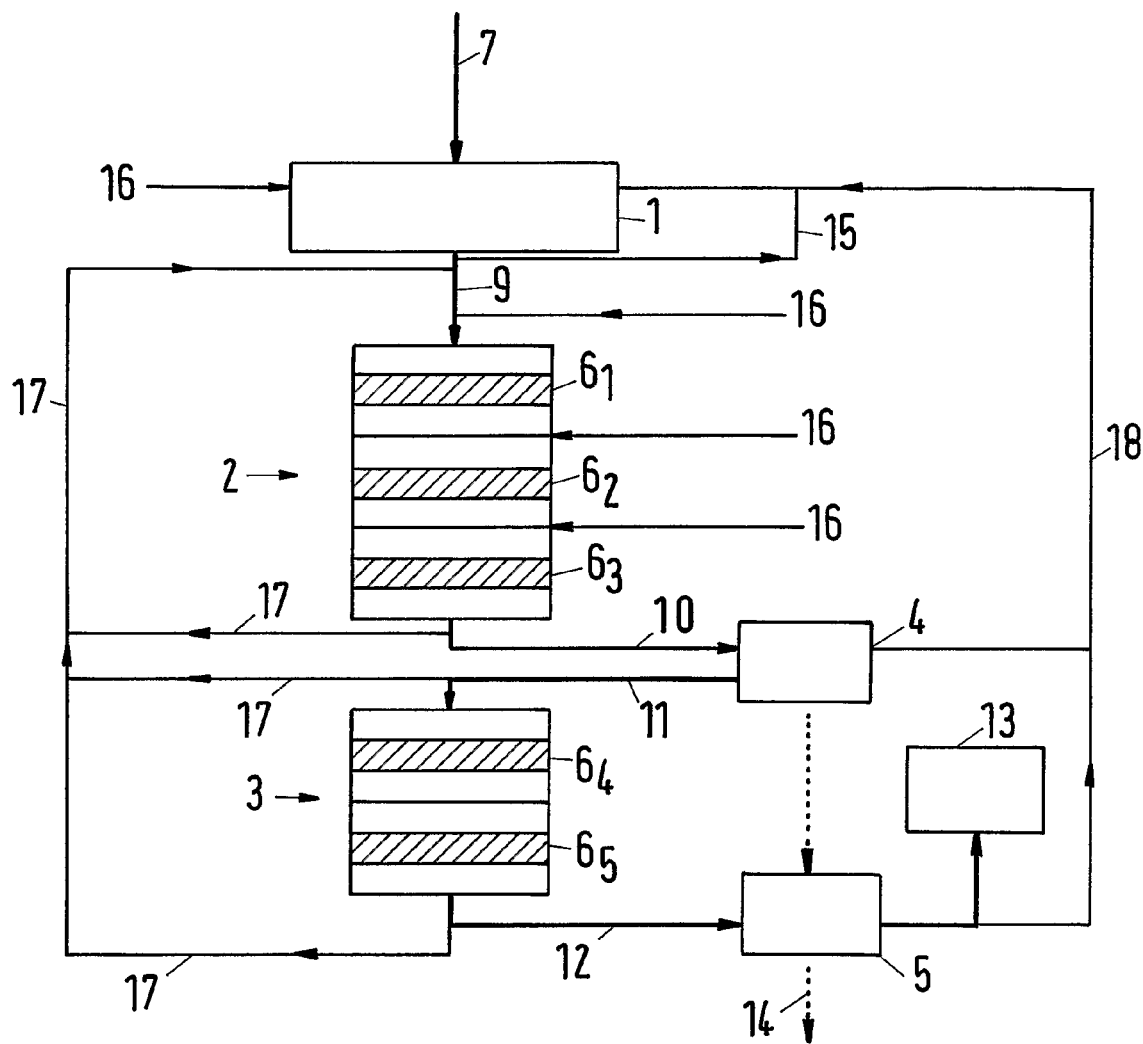
FIG. 3 shows a process diagram of a process and a plant in accordance with a second embodiment of the present invention.

In contrast to the apparatus shown in FIG. 2, the plant illustrated in FIG. 3 includes a plurality of recirculation conduits 15, 17, 18, of which two recirculation conduits 17 each lead from the outlet of the third contact stage $6_3$ and the outlet of the fifth contact stage $6_5$ to the gas conduit 9 leading to the first contact stage $6_1$, and of which two recirculation conduits 18 each lead from the outlet of the intermediate absorber 4 and the outlet of the final absorber 5 to the sulfur burner 1, and via each of which a partial stream of the process gas is recirculated. In addition, via the recirculation conduit 15 leading from the outlet of the sulfur burner 1 to the gas conduit 18, a partial stream of the $SO_2$-containing starting gas is recirculated to the sulfur burner 1.

By means of the recirculation of the process gases, a better utilization of energy is achieved as compared to the conventional processes, as hereby the thermal energy of the recirculated, partly converted and hot process gases is utilized for pre-heating the starting gases and/or the sulfur burner 1, so that merely a correspondingly smaller amount of thermal energy must be supplied externally. Apart from this, the recirculation of partial process gas streams withdrawn from the outlet of the two contacts 2, 3, which apart from $SO_2$ and $O_2$ also contain $SO_3$, effects a greater variability in terms of process control. This is connected with the fact that $SO_3$ displaces the thermodynamic equilibrium of the oxidation reaction on the part of the products, so that in this embodiment a total of five parameters, namely the inlet temperature, the inlet pressure, and the $SO_2$, $O_2$ and $SO_3$ contents, are available for controlling the temperature in the first contact stage $6_1$. Finally, the recirculation of the process gases also contributes to a greater yield. In accordance with the invention, however, only such amounts of process gas are recirculated, which provide a contact gas supplied to the first contact stage with a sulfur dioxide content of more than 16 vol-% and with a volumetric ratio of sulfur dioxide to oxygen of more than 2.67:1.

Figure 4:
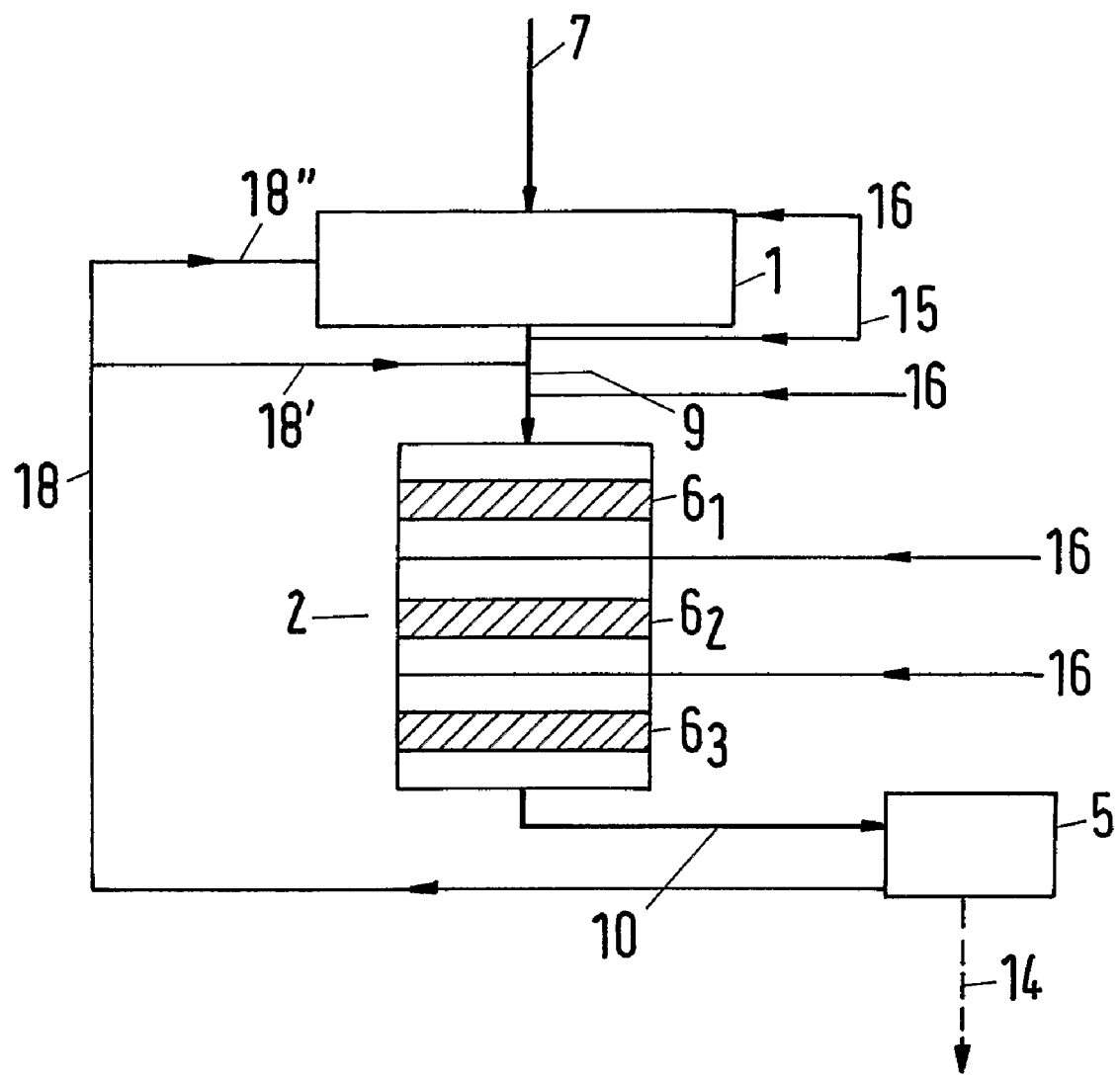
FIG. 4 shows a process diagram of a process and a plant in accordance with a third embodiment of the present invention.

In contrast to the apparatus shown in FIG. 3, the plant illustrated in FIG. 4 includes only one contact 2, which consists of the three contact stages $6_1$ to $6_3$, as well as an absorber 5. In addition, this embodiment includes only one recirculation conduit 18 extending from the outlet of the absorber 5, which via the partial conduit 18' leads to the inlet conduit 9 for the first contact stage $6_1$ and via the partial conduit 18" to the sulfur burner 1. Due to the only one contact 2, the plant is correspondingly compact and inexpensive. A yield of nevertheless approximately 100%, even with the use of highly concentrated starting gases, based on the amount of $SO_2$, for instance those with an $SO_2$ content of more than 90 vol-%, can be achieved by a correspondingly high degree of recirculation.

Figure 5:
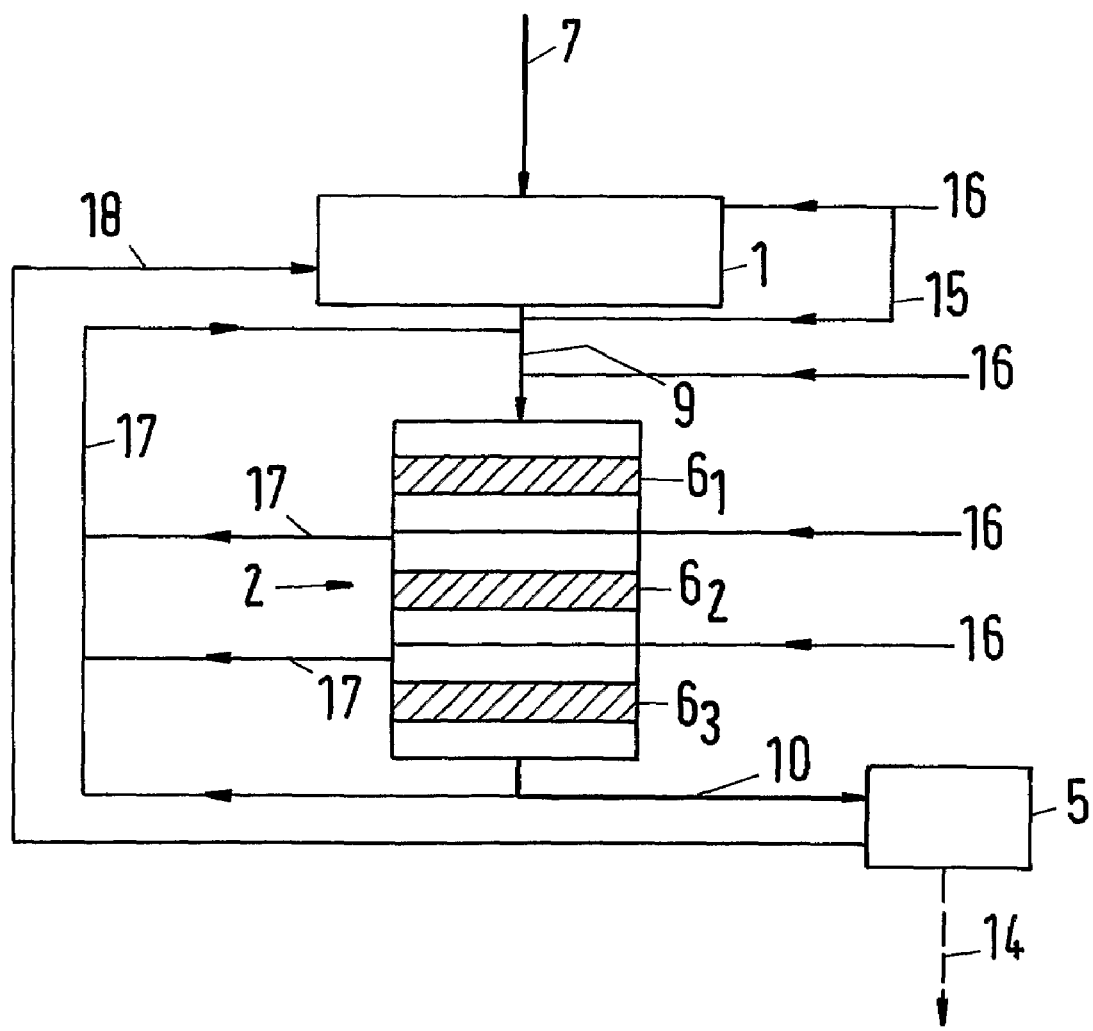
FIG. 5 shows a process diagram of a process and a plant in accordance with a fourth embodiment of the present invention.

The process diagram shown in FIG. 5 differs from the one shown in FIG. 4 in that beside a recirculating conduit 18 leading from the outlet of the absorber 5 into the sulfur burner 1 there are provided three recirculation conduits 17 extending from the outlet of the individual contact stages $6_1$ to $6_3$, which converge to one collecting conduit and lead to the inlet conduit 9. By providing a recirculation conduit 17 after each contact stage $6_1$ to $6_3$, an even greater variability of the process is achieved in terms of process control.

LIST OF REFERENCE NUMERALS 1 sulfur burner
2 first contact (primary contact)
3 second contact (secondary contact)
4 intermediate absorber
5 final absorber
6 contact stage
7 sulfur supply conduit
8 supply conduit for combustion gas
9 supply conduit to the first contact
10 gas conduit to the intermediate absorber
11 supply conduit to the second contact
12 conduit to the final absorber
13 chimney
14 product discharge conduit
15 bypass conduit
16 supply conduit for tonnage oxygen
17 recirculation conduit
18 recirculation conduit

The invention claimed is:

1. A process for producing sulfuric acid, oleum or liquid sulfur trioxide, in which a starting gas containing sulfur dioxide at least partly reacts with molecular oxygen in at least one contact with at least one contact stage to form sulfur trioxide, and in which the sulfur-trioxide-containing gas produced is introduced into an absorber and converted there to sulfuric acid, wherein a contact gas with a sulfur dioxide content of more than 80 vol-%, 0.01 to 10 vol-% oxygen, and with a volumetric ratio of sulfur dioxide to oxygen of more than 2.67:1 is introduced to a first contact stage.

2. The process as claimed in claim 1, wherein the contact gas introduced to the first contact stage has a sulfur dioxide content of more than 90 vol-%.

3. The process as claimed in claim 1, wherein the volumetric ratio of sulfur dioxide to oxygen of the contact gas introduced to the first contact stage is more than 8:1.

4. The process as claimed in claim 1, wherein the contact gas introduced to the first contact stage consists of 80 to 99.99 vol-% sulfur dioxide, 0.01 to 10 vol-% oxygen, and 0 to maximally 10 vol-% nitrogen or another inert gas.

5. The process as claimed in claim 4, wherein the contact gas is produced by combustion of elementary sulfur with tonnage oxygen.

6. The process as claimed claim 1, wherein the first contact stage includes a catalyst comprising vanadium pentoxide.

7. The process as claimed in claim 6, wherein the contact gas is introduced to the first contact stage, which includes a catalyst comprising vanadium pentoxide, with a temperature of at least 450° C.

8. The process as claimed in claim 1, wherein the contact gas is introduced to the first contact stage with a pressure of 1 to 30 bar.

9. The process as claimed in claim 1, wherein the sulfur dioxide content, the volumetric ratio $SO_2/O_2$, the inlet pressure and the inlet temperature of the contact gas introduced to the first contact stage are chosen such that in the contact stage a temperature is obtained, which is below the temperature that will lead to a damage of the catalyst, but above the operating temperature of the catalyst.

10. The process as claimed in claim 1, wherein downstream of the first contact stage, two to four further contact stages are provided, which preferably are combined to one or two contacts.

11. The process as claimed in claim 10, wherein the process gas leaving the first to penultimate contact stages is mixed with oxygen, is adjusted to an inlet temperature suitable for the next contact stage, and is supplied to the respectively next contact stage.

12. The process as claimed in claim 10, wherein the process gas leaving the last contact stage is supplied to an absorber.

13. The process as claimed in claim 10 wherein from the process gas leaving the first contact stage and/or from one or more of the process gases leaving the second to last contact stages at least one partial stream is withdrawn, and this partial stream is mixed with the starting gas before the same enters the first contact stage and/or with the combustion gas used for the combustion of elementary sulfur for producing the sulfur-dioxide-containing starting gas and/or is supplied directly to the sulfur burner.

14. The process as claimed in claim 10 wherein from the process gas leaving the intermediate absorber and/or the final absorber at least one partial stream is withdrawn, and this partial stream is mixed with the starting gas before the same enters the first contact stage and/or with the combustion gas used for the combustion of elementary sulfur for producing the sulfur-dioxide-containing starting gas and/or is supplied directly to the sulfur burner.

15. The process as claimed in claim 1, wherein only one contact with downstream absorber is provided, from the process gas leaving a contact stage a partial stream is withdrawn before and/or after the absorption stage, and this partial stream is mixed with the starting gas before the same enters the first contact stage and/or with the combustion gas used for the combustion of elementary sulfur for producing the sulfur-dioxide-containing starting gas and/or is supplied directly to the sulfur burner.

16. The process as claimed in claim 10, wherein the contact gas introduced to the first contact stage consists of 80 to 99.99 vol-% sulfur dioxide, 0.01 to 10 vol-% oxygen, 0.01 to 20 vol-% sulfur trioxide, and 0 to maximally 10 vol-% nitrogen or another inert gas.

17. The process as claimed in claim 1, wherein the volumetric ratio of sulfur dioxide to oxygen of the contact gas introduced to the first contact stage is more than 10:1.

18. The process as claimed in claim 1, wherein the contact gas introduced to the first contact stage consists of 90 to 95 vol-% sulfur dioxide, 3 to 7 vol-% oxygen, and 0 to maximally 5 vol-% nitrogen or another inert gas.

19. The process as claimed in claim 6, wherein the contact gas is introduced to the first contact stage, which includes a catalyst comprising vanadium pentoxide, with a temperature of at least 470° C.

20. The process as claimed in claim 1, wherein the contact gas is introduced to the first contact stage with a pressure of 3 to 12 bar.

21. The process as claimed in claim 11, wherein the process gas leaving the first to penultimate contact stages is mixed with oxygen upon passage through an intermediate absorber.

22. The process as claimed in claim 10, wherein the contact gas introduced to the first contact stage consists of 90 to 95 vol-% sulfur dioxide, 3 to 7 vol-% oxygen, 0.01 to 5 vol-% sulfur trioxide, and 0 to maximally 5 vol-% nitrogen or another inert gas.

* * * * *